(12) United States Patent
Simard et al.

(10) Patent No.: US 11,726,002 B2
(45) Date of Patent: *Aug. 15, 2023

(54) OPTICAL TEST INSTRUMENT WITH REMOVABLE CARTRIDGE

(71) Applicant: EXFO Inc., Quebec (CA)

(72) Inventors: Michael Simard, Quebec (CA); Kristine Palanjyan, Quebec (CA); Stephane Perron, Quebec (CA)

(73) Assignee: EXFO INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,355

(22) Filed: May 27, 2021

(65) Prior Publication Data
US 2021/0278313 A1 Sep. 9, 2021

Related U.S. Application Data

(63) Continuation-in-part of application No. 16/553,964, filed on Aug. 28, 2019, now Pat. No. 11,022,520.
(Continued)

(51) Int. Cl.
*G01M 11/08* (2006.01)
*G01M 11/00* (2006.01)
(Continued)

(52) U.S. Cl.
CPC ......... *G01M 11/086* (2013.01); *G01J 1/0271* (2013.01); *G01J 1/04* (2013.01);
(Continued)

(58) Field of Classification Search
CPC ............ G01M 11/02; G01M 11/0207; G01M 11/085; G01M 11/086; G01M 11/30;
(Continued)

(56) References Cited

U.S. PATENT DOCUMENTS 4,741,616 A * 5/1988 So ........................ G01M 11/31
356/73.1
5,530,783 A 6/1996 Belopolsky et al.
(Continued)

FOREIGN PATENT DOCUMENTS

CN 103868672 A 6/2014
CN 106575020 A 4/2017
(Continued)

OTHER PUBLICATIONS

Machine translation of JP-2002328071-A. 8 pages. (Year: 2002).*
(Continued)

*Primary Examiner* — Gordon J Stock, Jr.

(57) ABSTRACT

An optical test instrument, in combination with a removable connector cartridge is provided. A method of replacing a damaged or worn optic fiber interface is also provided. The optical test instrument has casing having a cartridge receiving cavity therein with an inner end provided with a test instrument optical port; and an outer end provided with a cartridge receiving opening. The connector cartridge is sized and configured to be inserted in the cartridge receiving cavity. The connector cartridge has a cartridge inner end for facing the test instrument optical port when in use, and a cartridge outer end for receiving an optic fiber from a device under test (DUT). The connector cartridge houses a fiber optic cable extending between the cartridge inner end and the cartridge outer end. The connector cartridge is removably connectable to the instrument casing to allow replacement of the connector cartridge when the cartridge outer end is worn or damaged.

18 Claims, 13 Drawing Sheets

Related U.S. Application Data

(60) Provisional application No. 62/744,161, filed on Oct. 11, 2018.

(51) Int. Cl.
| | |
|---|---|
| *G02B 6/38* | (2006.01) |
| *G01J 1/02* | (2006.01) |
| *G01J 1/04* | (2006.01) |
| *G02B 6/42* | (2006.01) |

(52) U.S. Cl.
CPC .... *G01M 11/3136* (2013.01); *G01M 11/3154* (2013.01); *G02B 6/3825* (2013.01); *G02B 6/3827* (2013.01); *G02B 6/3893* (2013.01); *G02B 6/3897* (2013.01); *G02B 6/421* (2013.01)

(58) Field of Classification Search
CPC ............. G01M 11/31; G01M 11/3109; G01M 11/3136; G01M 11/3154; G01M 11/33; G02B 6/38; G02B 6/3807; G02B 6/381; G02B 6/3823; G02B 6/3825; G02B 6/3826; G02B 6/3827; G02B 6/3829; G02B 6/3846; G02B 6/385; G02B 6/3887; G02B 6/389; G02B 6/3893; G02B 6/3894; G02B 6/3897; G02B 6/42; G02B 6/4201; G02B 6/4202; G02B 6/421; G02B 6/4216; G02B 6/4219; G02B 6/4285; G02B 6/4286; G02B 6/4292; G02B 6/43; G01J 1/0271; G01J 1/04; G01J 1/0403; G01J 3/0218; G01D 5/35354

See application file for complete search history.

(56) References Cited

U.S. PATENT DOCUMENTS

| | | | |
|---|---|---|---|
| 5,778,122 A | 7/1998 | Giebel et al. | |
| 5,940,559 A | 8/1999 | Noll | |
| 6,174,178 B1 | 1/2001 | Reinhold | |
| 6,419,399 B1 * | 7/2002 | Loder | G02B 6/3893 385/53 |
| 6,439,777 B1 * | 8/2002 | Harrison | G02B 6/3827 385/53 |
| 6,733,185 B2 | 5/2004 | Zhao et al. | |
| 6,789,950 B1 * | 9/2004 | Loder | G02B 6/3885 385/88 |
| 6,926,449 B1 | 8/2005 | Keenum et al. | |
| 7,329,049 B2 * | 2/2008 | Meek | G02B 6/3801 385/95 |
| 7,373,069 B2 | 5/2008 | Lazo | |
| 7,406,242 B1 * | 7/2008 | Braga | G02B 6/4453 385/134 |
| 7,665,901 B2 * | 2/2010 | Kewitsch | G02B 6/3825 385/55 |
| 8,480,310 B2 | 7/2013 | Kewitsch | |
| 8,985,869 B1 | 3/2015 | Peng et al. | |
| 9,568,701 B2 | 2/2017 | Czosnowski et al. | |
| 9,654,213 B2 | 5/2017 | Ruchet et al. | |
| 9,846,281 B2 * | 12/2017 | Murray | G01M 11/088 |
| 9,857,540 B2 | 1/2018 | Ahmed et al. | |
| 9,900,087 B2 | 2/2018 | Ruchet | |
| 9,980,021 B2 | 5/2018 | Oltman et al. | |
| 10,260,989 B2 | 4/2019 | Hallett et al. | |
| 10,330,868 B2 * | 6/2019 | Li | G02B 6/3897 |
| 10,488,597 B2 | 11/2019 | Parikh et al. | |
| 10,656,343 B1 * | 5/2020 | Applebaum | G02B 6/385 |
| 10,801,918 B2 * | 10/2020 | Adams | G01M 11/3127 |
| 10,928,274 B2 * | 2/2021 | Adams | G01M 11/33 |
| 11,022,520 B2 * | 6/2021 | Simard | G01J 1/0271 |
| 2004/0170369 A1 | 9/2004 | Pons | |
| 2014/0024255 A1 * | 1/2014 | Robitaille | H04B 10/40 439/607.2 |
| 2015/0002837 A1 | 1/2015 | Benjamin | |
| 2015/0063757 A1 | 3/2015 | Leyva, Jr. et al. | |
| 2015/0063761 A1 | 3/2015 | Hallett et al. | |
| 2017/0017053 A1 * | 1/2017 | Li | G02B 6/4292 |
| 2018/0052289 A1 * | 2/2018 | Lin | G02B 6/421 |
| 2019/0307330 A1 * | 10/2019 | Okada | A61B 5/0084 |

FOREIGN PATENT DOCUMENTS

| | | | | |
|---|---|---|---|---|
| EP | 3304024 A1 | 4/2018 | | |
| JP | S63233346 A | 9/1988 | | |
| JP | 2002328071 A | * 11/2002 | ............ | G01M 11/30 |
| KR | 20160122594 A | 10/2016 | | |
| TW | M484712 U | 8/2014 | | |

OTHER PUBLICATIONS

Search Report for CN2019108105288 issued by the China National Intellectual Property Administration, dated Apr. 11, 2022 (3 pages).
One pair of 90 degrees fiber optic adaptyer cables to go 40016 velicity right angle toslink port saver adapter; AGW10; Cable adapter; DVI; Ali express: https://www.aliexpress.com/item/One-Pair-of-90-Degrees-Fiber-Optic-Adapter-Cables-T. (Jun. 5, 2018).
AN-137 Preventing damage to optical connectors; OptoTest Corporation Headquarters 4750 Calle Quetzal Camarillo, CA 93012 USA; https://www.optotest.com/137-preventing-damage-optical-connectors/#. (Aug. 1, 2016).

* cited by examiner

OPTICAL TEST INSTRUMENT WITH REMOVABLE CARTRIDGE

This application claims priority on U.S. patent application Ser. No. U.S. Provisional patent application Ser. No. 16/553,964 filed on Aug. 28, 2019, claiming priority of 62/744,161 which was filed on Oct. 11, 2018, both entitled "Optical Test Instrument with Removable Cartridge", and which content is incorporated therein.

TECHNICAL FIELD

The technical field generally relates to optical test devices and instruments, and more particularly, to a removable connector cartridge for use in combination with an optical test instrument.

BACKGROUND

Different types of optical test instruments and measurement devices are available to verify and measure parameters of optical signals, which can be indicative of the state and performance of optical fibers or of optical switching, repeater or interconnecting devices in a network. Optical test instruments include optical time-domain reflectometers (OTDRs) and optical power meters, stated as examples only.

Repeated connection and disconnection of fiber connectors between the devices under test (DUT) and the test instrument connectors may lead to wear of the test instrument's connectors and/or optic fiber interfaces over time. In addition, the output connectors on test instruments are often exposed. Therefore, dust, particles or oil contamination (from fingerprints) can affect the interface of the connector and/or optic fibers. The degradation of optical output connectors can lead to increased initial dead zone, reduced measurement range and increased measurement uncertainty. Preserving the cleanliness and integrity of the optical connectors of test instruments is critical, since damaged connectors or wear and dust on optical fiber interfaces can increase loss and reflections, which affect the accuracy of the measurements. As such, when optical connectors on test instruments are worn or damage, they must be replaced, which involves sending the instrument to a repair center, which can be costly and prevents technicians and engineers from using their tool while the instrument is being repaired.

One known solution to this issue is to leave "saver cables" connected to optical test instruments. Optical fiber cables are left connected to the test instruments almost permanently until the interface of the "saver cable" becomes damaged, at which point the cable is replaced or repolished. This solution is however unpractical, since it means leaving a dangling cable attached to the test instruments. In addition, improper "saver cables" can be mistakenly connected to the test instruments, resulting in inaccurate measurements.

Based on the foregoing, challenges remain in preserving the integrity of test instruments' optical ports and connectors, and in facilitating their replacement when required.

SUMMARY

In accordance with one aspect, there is provided an optical test instrument. The optical test instrument comprises an instrument casing, including measurement components therein, and a cartridge receiving cavity extending within the instrument casing. The cartridge receiving cavity has an inner end provided with a test instrument optical port, and an outer end provided with a cartridge receiving opening, the opening being located on the instrument casing. The optical test instrument further comprises a connector cartridge sized and configured to fit in the cartridge receiving cavity. The connector cartridge has a cartridge inner end which faces the test instrument optical port, and a cartridge outer end for optical coupling to a device under test (DUT). The connector cartridge houses a fiber optic cable extending between the cartridge inner end and the cartridge outer end. The connector cartridge is removably connectable to the instrument casing.

In some implementations, the connector cartridge comprises a first connector at the cartridge inner end, for interfacing with the test instrument optical port of the optical test instrument; and a second connector at the cartridge outer end; the fiber optic cable extending between the first and second connectors.

In some implementations, the outer end of the connector cartridge is provided with a DUT connector adapter, the second connector of the fiber optic cable being received at one side of the DUT connector adapter.

In some implementations, the connector cartridge has a U-shape defining a first branch insertable into the cartridge receiving cavity and comprising the cartridge inner end; and a second branch comprising the cartridge outer end and configured to extend outside of the instrument casing along an outer wall of the instrument casing when the first branch of the connector cartridge is inserted inside the cartridge receiving cavity.

In some implementations, the optical test instrument is an Optical Time Domain Reflectometer (OTDR), and the optical test instrument further comprises an OTDR launch cord having an instrument end connectable to the second connector and a DUT end connectable to the DUT.

In some implementations, the optical test instrument may further comprise a launch cord cassette configured for mounting to the instrument casing proximate to a location of the second branch of the connector cartridge when the first branch of the connector cartridge is inserted inside the cartridge receiving cavity, the launch cord cassette comprising a cord housing storing a section of the OTDR launch cord near the instrument end.

In some implementations, the launch cord cassette comprises one or more cord spools provided inside the cord housing.

In some implementations, the cord housing comprises a pair of cord through holes, the instrument end and the DUT end of the OTDR launch cord projecting through said through holes, respectively.

In some implementations, the launch cord cassette comprises a removable cover providing access to said cord housing.

In some implementations, the first and second connectors are angled physical contact (APC) connectors or ultra-physical contact (UPC) connectors.

In some implementations, the first and second connectors are one of SC, LC, FC and MTP/MPO connectors, the fiber optic cable being a single fiber or multi-fiber fiber cable.

In some implementations, the instrument end and/or the DUT end of the OTDR launch cord is provided with an angled physical contact (APC) connector or ultra-physical contact (UPC) connector.

The optical test instrument according to claim 5, wherein the instrument end and/or the DUT end of the OTDR launch cord is provided with one of SC, LC, FC and MTP/MPO connectors, the fiber optic cable being a single fiber or multi-fiber fiber cable.

In some implementations, the connector cartridge is provided with a resilient clip on the first branch, allowing toolless insertion and removal of the cartridge from within the instrument casing.

In accordance with another aspect, there is provided a fiber optic connector cartridge, for use in combination with an optical test instrument, the test instrument receiving a fiber optical cable of a device under test (DUT), the connector cartridge comprising:

a cartridge casing, sized and configured to fit in a cartridge receiving cavity extending within the optical test instrument, the cartridge casing having an inner end and an outer end, the outer end being provided with a DUT connector adapter, for optically coupling to the DUT;

a fiber optic cable housed within the cartridge casing, the fiber optic cable comprising a first connector and a second connector, and a fiber optic link extending therebetween, the first connector being configured for interfacing with an optical port inside the test instrument;

the second connector of the fiber optic cable being received at one side of the DUT connector adapter;

the connector cartridge being removably and toollessly connectable to the optical test instrument.

In some implementations, the connector cartridge has a U-shape defining a first branch insertable into the cartridge receiving cavity and comprising the cartridge inner end; and a second branch comprising the cartridge outer end and configured to extend outside of the instrument casing along an outer wall of the instrument casing when the first branch of the connector cartridge is inserted inside the cartridge receiving cavity.

In some implementations, the optical test instrument is an Optical Time Domain Reflectometer (OTDR), provided in combination with an OTDR launch cord having an instrument end connectable to the second connector and a DUT end connectable to the DUT.

In some implementations, the fiber optic connector cartridge and OTDR launch cord combination is provided in further combination with a launch cord cassette configured for mounting to the instrument casing proximate to a location of the second branch of the connector cartridge when the first branch of the connector cartridge is inserted inside the cartridge receiving cavity, the launch cord cassette comprising a cord housing storing a section of the OTDR launch cord near the instrument end.

DETAILED DESCRIPTION

Figure 1:
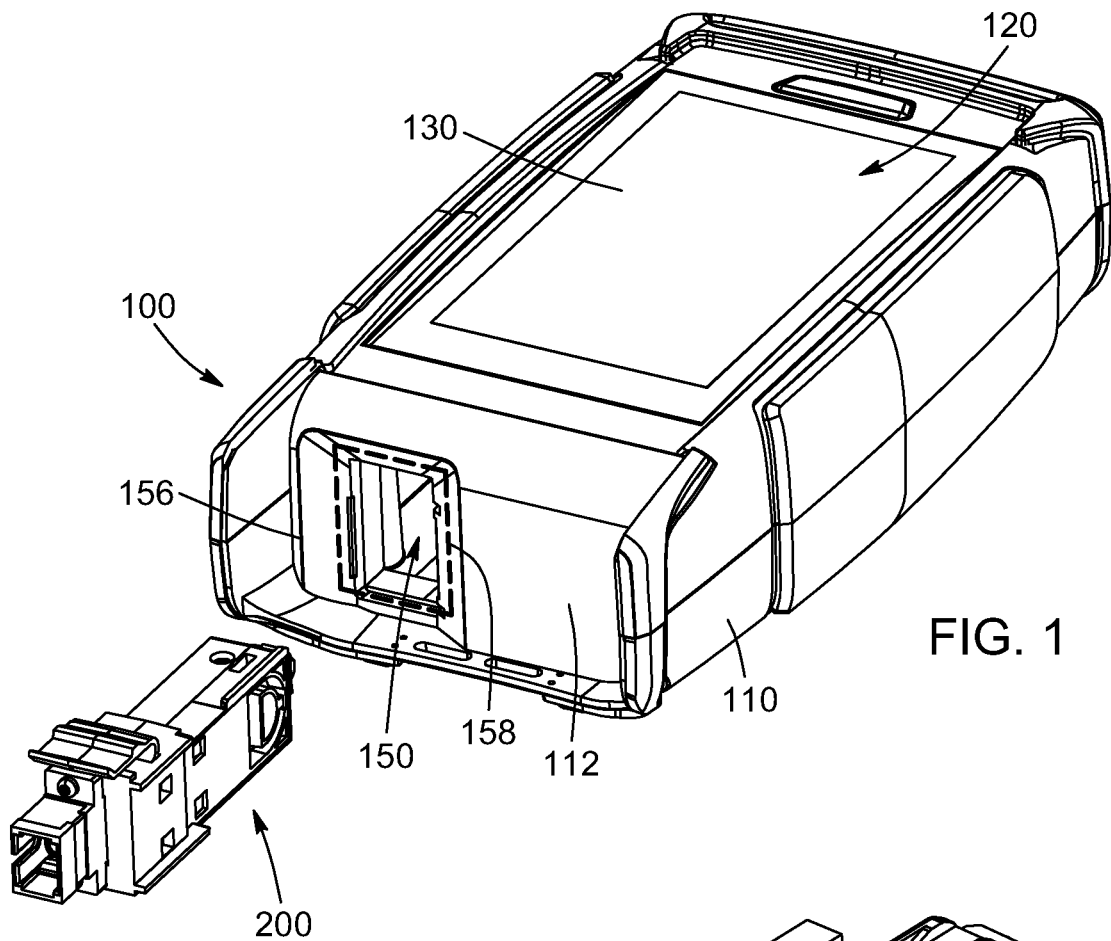
FIG. 1 is a perspective view of an optical test instrument and of its connector cartridge, according to a possible embodiment.

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and structures of the present embodiments. It should also be noted that positional descriptors such as up and down, inner and outer, and other like terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

It is also noted, and unless otherwise mentioned, that terms such as "substantially" and "about" which modify a value, condition or characteristic of a feature of an exemplary embodiment, should be understood to mean that the value, condition or characteristic is defined within tolerances that are acceptable for proper operation of this exemplary embodiment for its intended application.

The present description generally relates to an optical connector cartridge which can be removably connected to or fitted in an optical test instrument, to preserve the optical port of the test instrument. The optical connector cartridge can thus be removed or replaced by the end users, to replace a damage or worn fiber end, or to receive different types of DUT optical connectors. The optical connector cartridge comprises two connectors and an optical link extending between the connectors. The optical link can be a single or multi-fiber cable. The fiber under test can be single-mode or multi-mode types. One of the connectors interfaces with an optical cable or connector of a Device Under Test (DUT), either directly or indirectly, and the other connector interfaces with an optical port or connector of the test instrument. The optical connector cartridge can also be referred to as an optical connector cassette; a fiber optic connector cartridge; or a connector saving cassette, since it allows for preserving or extending the lifetime of optical ports of test instruments. The description also relates to the optical test instrument that receives or interfaces with the connector cartridge, and to a method for replacing the connector cartridge from the test instrument.

Referring now to FIG. 1, an optical test instrument (100) is illustrated, according to a possible embodiment. In this exemplary embodiment, the optical test instrument (100) is an Optical Time Domain Reflectometer (ODTR), but it should be noted that the present description applies to other types of test instruments, such as power meters, Optical Spectrum Analyzers (OSA), Variable Attenuators (VOA), and Wavelength-Division Multiplexing (WDM) or Coarse Wavelength-Division Multiplexing (CWDM) optical channel checkers for monitoring WDM channels on optical fiber links and/or for measuring optical power of individual channels, as examples only. In fact, the optical connector cartridge (200) can be used with any type of optical test instrument that interfaces with optical links or fiber optic cables, to test or qualify the fiber, such as pass/no-pass test; or with optical test instruments that measure optical parameters based on the signal transiting through the optical link. In some embodiments, the optical test instrument is a portable optical test instrument, meaning that the test instrument can be transported by an engineer or technician to test, characterize or measure optical signals from different types of devices under test. Yet still, the optical test instrument can be a handheld portable optical test instrument, provided with a display or other visual (or sound) indicators, for providing feedback on the status of the optical signals being monitored.

The optical test instrument (100) is provided with an instrument casing (110), which houses and protects different components necessary for the working of the instrument, such as measurement components (120), including for example, switches, mirrors, transceivers, amplifiers, microprocessors, optical processors, storage memory and the likes. The casing (110) can be made of one or several casing sections, of different materials, such as for example shock resistant molded plastic. The casing (110) is provided with a cartridge receiving cavity (150), which extends within the instrument casing (110). The cartridge receiving cavity (150) preferably extends with the casing (110) to hide most of the connector cartridge (200) when inserted therein. In other embodiments though, it can be considered that the optical connector cartridge (200) be entirely received within the cavity (150), without any portion of the cartridge extending outside the test instrument (100). Yet in other embodiments, it can also be considered that the connector cartridge (200) extends for its most part outside the test instrument (100).

Figure 2:
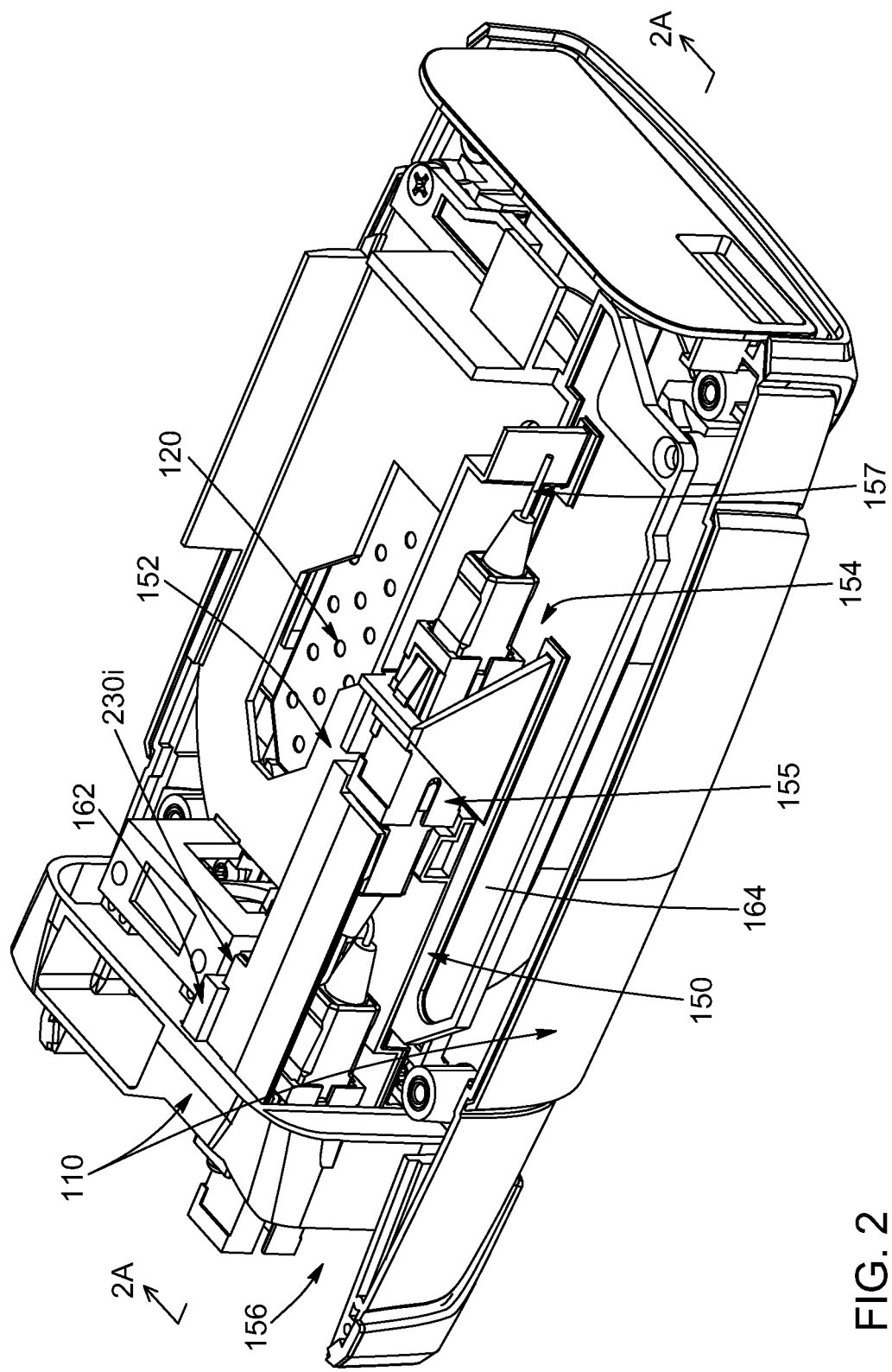
FIG. 2 is a top perspective view of the test instrument shown partially open, with the connector cartridge of FIG. 1 inserted in the optical test instrument.

Still referring to FIG. 1, and also to FIG. 2, the cartridge receiving cavity (150) has an inner end (152) provided with, or connected to, a test instrument optical port (154) and an outer end (156) provided with a cartridge receiving opening (158), said opening being located on the instrument casing (110), while the inner end is located inside the instrument casing. The cartridge receiving cavity (150) does not need to be defined by sidewalls; it is simply the region or area within the test instrument which can receive the optical connector cartridge (200).

The cartridge receiving cavity (150) can be provided on any side of the optical test instrument (100), but for practical reasons, in the illustrated embodiment, the cartridge receiving cavity (150) is provided at the top end (112) of the casing (110), when a user holds the instrument to look at the display (130). Optical test instruments are typically provided with displays, for displaying parameters of the optical signals measured by the measurement components of the test instrument (100), but the display is optional. Different types of indicators can be provided instead, such as an on/off LED or small speakers emitting sound signals, which can be indicative of the state of the DUT or optical fiber being tested. In yet other embodiments, the optical measurements can be transmitted to a distinct processing device, such as a smart phone or tablet.

Figure 1A:
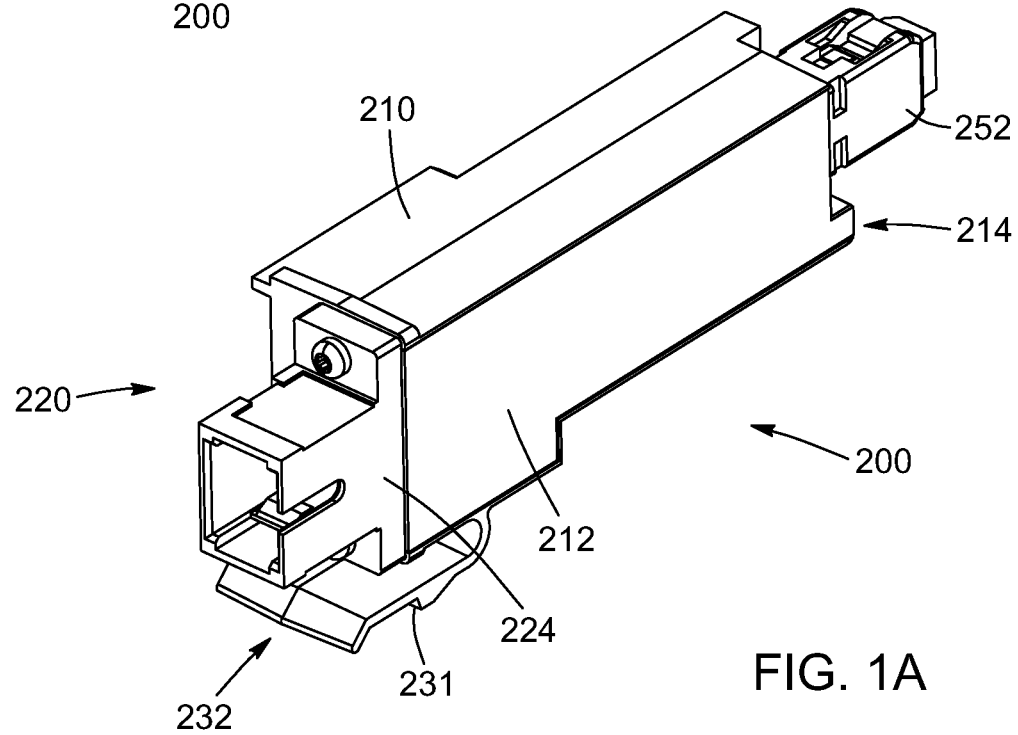
FIG. 1A is an enlarged view of the connector cartridge of FIG. 1.

Referring now to FIG. 1A, the connector cartridge (200) is sized and configured to fit in the cartridge receiving cavity (150). It will be readily understood that all of the connector cartridge (200) or only of portion thereof may have the size and configuration providing the fit of the cartridge within the cartridge receiving cavity. As mentioned above, the optical connector cartridge (200) may be entirely received within the cavity (150), without any portion of the cartridge extending outside the test instrument (100), or alternatively a portion of the cartridge may extend outside the test instrument (100) when the cartridge (200) is received within the cavity (200). In some embodiments, the connector cartridge (200) may extend for its most part outside the test instrument (100).

The connector cartridge (200) has a cartridge inner end (214) which faces the test instrument optical port (154) when inserted, and a cartridge outer end (220), which receives or interfaces with an optic fiber or fiber optic cable, from a device under test (DUT). The connector cartridge (200) houses at least one fiber optic cable (256)— identified and best shown in FIGS. 1B and 3B— extending between the cartridge inner end (214) and the cartridge outer end (220). The connector cartridge (200) is removably connectable to the test instrument, and more specifically to the instrument casing (110), to allow replacement of the connector cartridge (200), such as when the cartridge outer end (220) is worn or damaged. Preferably, end users can install and uninstall the cartridge from the test instrument using their fingers only, without any tool. The connection of the cartridge to the test instrument should however be robust enough to avoid unintended disconnection of the cartridge when in use.

Figure 1B:
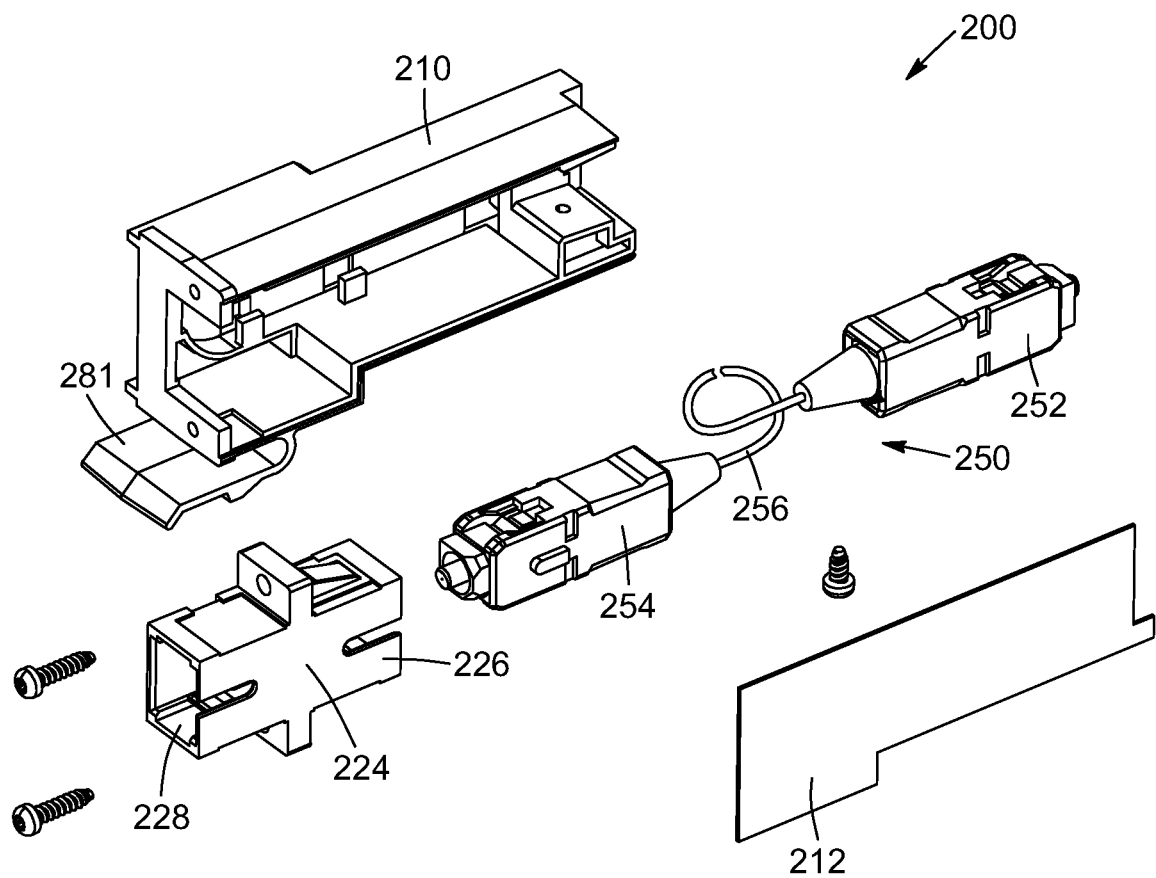
FIG. 1B is an exploded view of the connector cartridge of FIG. 1A.

Still referring to FIG. 1A, and also to FIG. 1B, the connector cartridge (200) is provided at its outer end with a connector adapter or connector receptacle (224), to receive the connector therein and the fiber optic cable from the DUT. The optical connector cartridge (200) comprises a cartridge casing (210), which is made in the illustrated embodiment from a single molded plastic part, closed on one of its lateral sides by a sticker (212). Other closing means or arrangements are possible, for example, it can be considered for the optical connector cartridge (200) to be left partially open on its side or to close it with another lateral sidewall section. In the embodiment illustrated, the cartridge casing (210) has a substantially rectangular shape, but other shapes and configurations are possible. In the embodiments shown, the optical connector cartridge or cartouche has an elongated cuboid shape reminiscent to a rectangular prism. Also visible in FIG. 2 is a clip (232), provided with a clip tab (231). When the optical connector cartridge (200) is inserted in the receiving cavity (150), the clip tab (231) engages with a corresponding recess in the casing (110) or another component of the test instrument, to connect and secure the cartridge (200) within the cavity (150). The clip (232) is slightly flexible or compressible, to allow disengagement of the clip tab (231) from the casing (110) for removal, when a user presses the clip. Other types of non-permanent connections can be considered, such as snap fit connections, male/female connectors, push buttons or even screws, just to name a few.

Figure 2A:
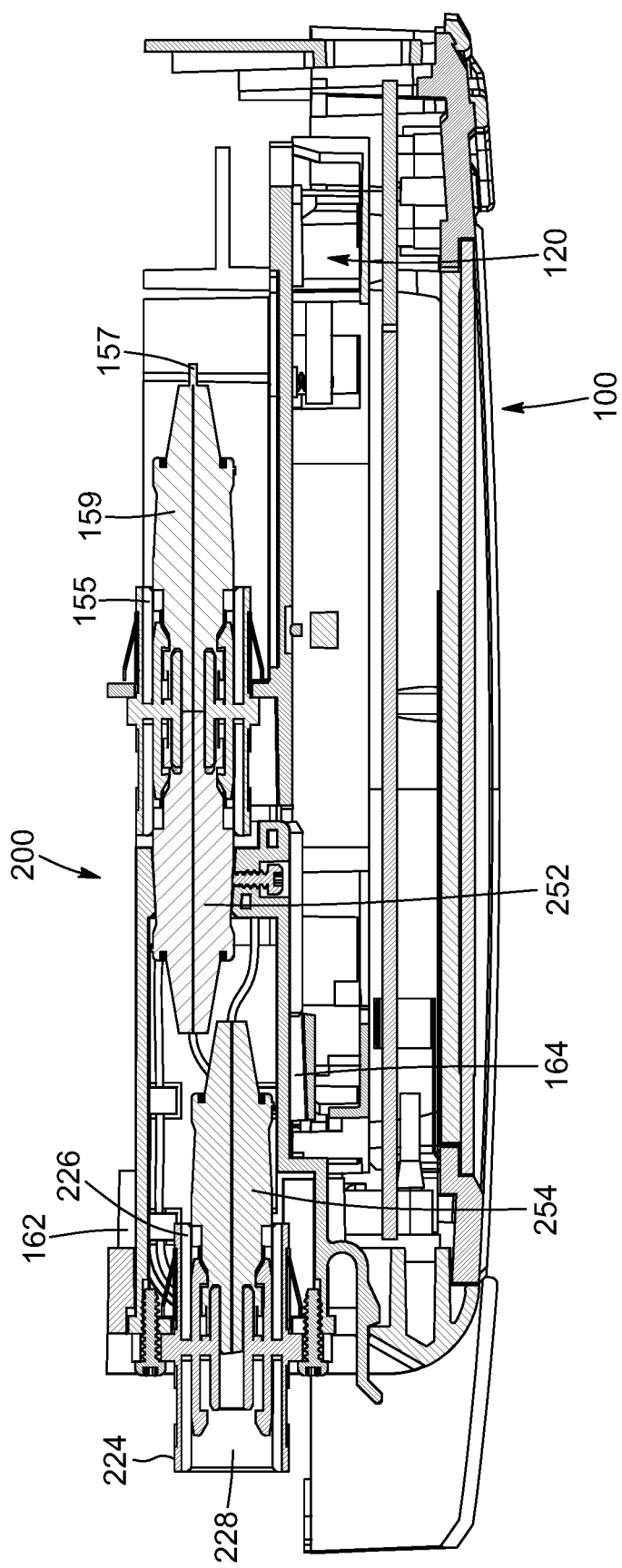
FIG. 2A is a partial cross-sectional view of the optical test instrument of FIG. 2.

Referring now to FIGS. 2 and 2A, a portion of the inside of the optical test instrument (100) is shown, with one of the casing sections removed. The cartridge receiving cavity (150) corresponds to the area of the casing in which the optical connector cartridge (200) fits. In the illustrated embodiment, the cartridge receiving cavity (150) is partially defined by a lower plate or partition (164) over which the cartridge casing (210) can slide, and by a flange (162), which receives or interfaces with a lip or flange (230i) of the connector cartridge (200). The cartridge receiving cavity (150) has a first (or inner) end (152), and second (or outer) end (156). Partially hidden under the plate (164) are the measuring and processing means (120) of the optical test instrument (100). The optical port (154) of the test instrument is also visible and includes an adapter (155) to receive on one side the end fiber extending out of the first connector (252) of the cartridge (200). The other side of the test instrument adapter (155) interfaces with a test instrument fiber cable (157), in this case via a test instrument connector 159, to transmit/send optical signals to/from the different measuring and processing components (120). In this embodiment, the connectors 252, 254 of the fiber optic link are offset one relative to the other, in the cartridge casing 210, so as to provide a compact cartridge, but other configurations are possible.

Figure 3A:
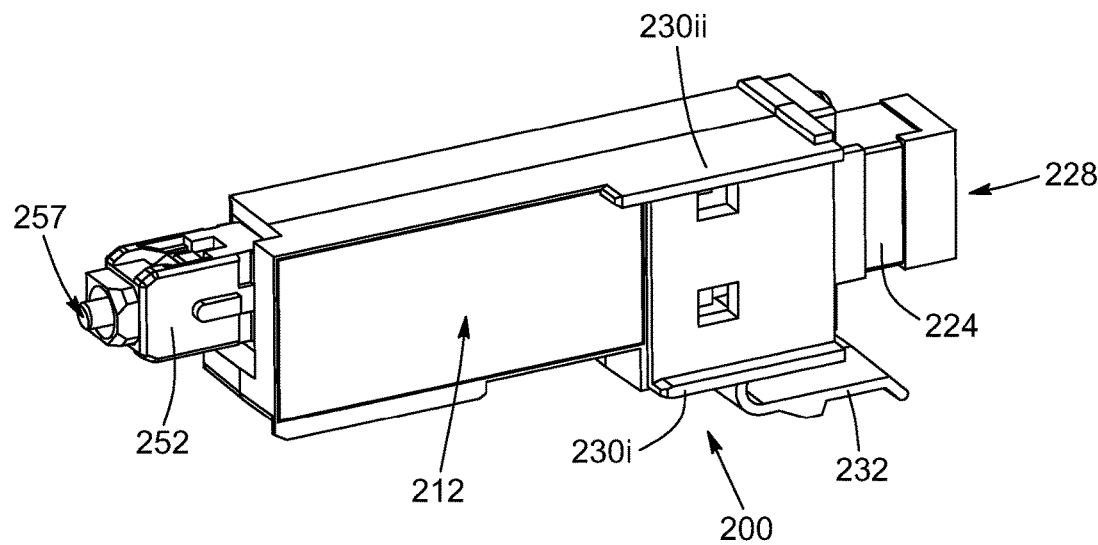
FIG. 3A is a side perspective view of the connector cartridge, according to a possible embodiment.
Figure 3B:
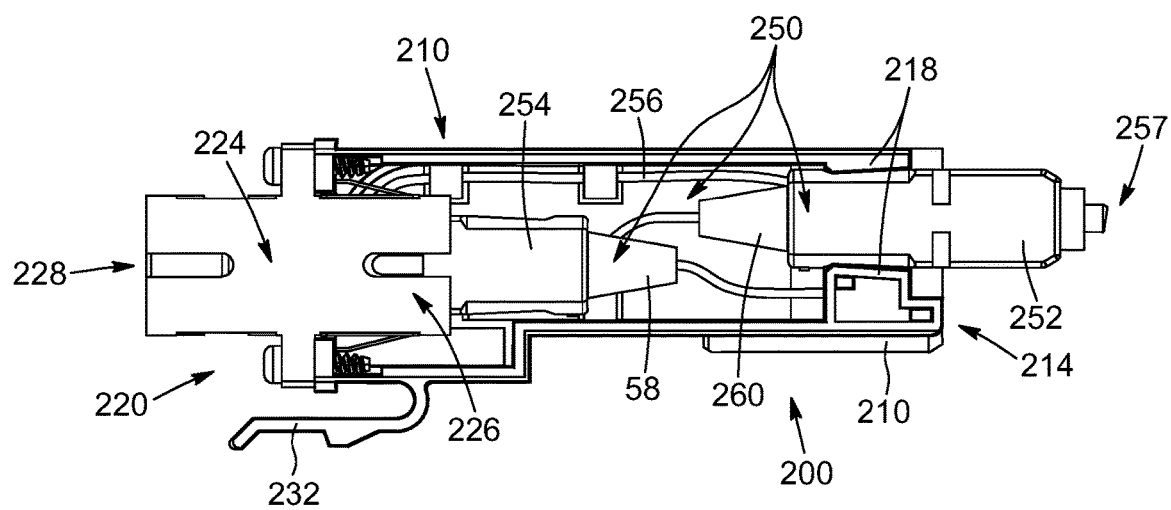
FIG. 3B is a side view of the connector cartridge, showing the interior of the connector cartridge.

FIGS. 3A and 3B show the fiber optic connector cartridge (200) from two opposed lateral views. According to possible embodiments, commercially available fiber optic patch cords (250) can be used, as in the illustrated example. Of course, different types of fiber optic cables can be used instead, with or without a protective layer or sheath. The fiber optic cable (256) can include a single optic fiber strand or multiple optic fiber strands. In the illustrative example of FIG. 3B, the fiber optic patch cord (250) is made of a first connector (252) at one end, for interfacing with the test instrument optical port or adapter of the optical test instrument; of a second connector (254) at the other end, for interfacing with the connector of a fiber optic cable from the DUT; and of a fiber optic cable (256) extending between the first and second connectors (252, 254). Preferably, the fiber optic cable (256) is a bend insensitive fiber optic cable. By "bend insensitive" it is meant that the fiber optic cable (250) can transmit light with minimum loss even if the cable is bent with a small bend radius. Bend insensitive fiber optic cables can include material of lower refraction index, provided to reflect the light back in the core of the optic fiber. The fiber optic cable can be single mode or multimode, and include a single optic fiber, or a plurality of optic fibers, such as 2, 8, 12, 24, etc. In other implementations, it can be considered for the fiber optic cable to extend substantially linearly between the first and second connectors (252, 254), or to be rolled or wind within the cartridge. Bending the optic fiber cable (250) within the cartridge allows minimizing the overall cartridge size. In the exemplary embodiment of FIG. 3B, the fiber is bend inside the cartridge, forming a first loop near the outer end (220), and forming another loop near the inner end (214), a portion of the loop extending through fiber slot (236) and wind around guide (234iv)— both features (236) and (234iv) being identified in FIG. 4B.

To further reduce the overall dimensions of the connector cartridge (200), the first and second connectors (252, 254) preferably have a reduced length, compared to standard-sized connectors (258, 260), for example between 30 and 50 mm. Such connectors are sometimes referred to as "mini boot" or "small boot" connectors. Of course, other types of connector boots are possible. The "boot" portion of the connectors is the inner connector portion identified by reference numbers (258, 260) in FIG. 3B. The first and second connectors (252, 254) can be angled physical contact (APC) connectors or ultra-physical contact (UPC) connectors, depending on the configuration needed for the end face (257) of the fiber. Other end face configurations are also possible. In addition, depending on the application, the first and second connectors (252, 254) can be standard connectors (SC), small form factor connectors, such as LC connectors, ferrule connectors, also referred to as "FC connectors"; and multi-fiber push on (MPO) connectors, as examples only.

Still referring to FIG. 3B, the cartridge (200) is provided with an adapter or "connector receptacle" (224). The adapter (224) has a first (inner) end (226) to receive the connector from the patch cord (250), and a second (outer) end (228), to receive the connector from a DUT optic fiber cable. The adapter (224) is secured to the casing (210) by means of screws and clips, but other securing means are possible, such as glue, for example.

The fiber optic cable can be either permanently affixed to the cartridge casing (210), or removably fitted in the casing (210), to allow replacement of the fiber and connectors (252, 254), rather than of the entire connector cartridge (200). Although for practical reasons, end users might prefer to replace the entire connector cartridge (200), such as for the embodiment shown, it can be considered to configure the casing such as to allow replacement of the optic fiber cable in the casing (210). In the illustrated embodiment, the patch cord (250) is glued to the casing (210). The cartridge casing (210) can include internal sidewalls and/or flanges (218)— identified in FIG. 3B—sized and configured to frictionally engage with the first and/or the second connectors (252, 254). Of course, other means to secure the connectors in the casing (210) are possible.

Still referring to FIGS. 3A and 3B, in order to facilitate the insertion and positioning of the connector cartridge in the test instrument, the cartridge casing (210) can be provided with lateral guiding flanges (230i, 230ii)— identified in FIG. 3A—that can mate with corresponding guiding slits or tabs (162)— identified in FIG. 2—to guide insertion and removal of the cartridge (200) from the cartridge cavity (150) of the instrument casing. Of course, such guiding means (230i, 230ii, 162) are optional and other configurations or arrangements are possible. Also shown on FIGS. 3A and 3B is the resilient clip (232), provided near the outer end (220) of the cartridge, allowing toolless insertion and removal of the cartridge from within the instrument casing. In the embodiment illustrated, the cartridge is made of a single part, made of molded plastic, having an open lateral side through which the fiber optic cable can be inserted. The cartridge casing (210) can be left opened, or can be closed with another casing section, or simply with a sticker, or any other closing means (212). End sides of the cartridge casing (214, 220) are open, to allow the adapter 224 and the connector (252) to extend outside of the casing (210). Of course, other casing configurations are possible. For example, the casing could be made of several casing sections affixed or clipped to one another.

Figure 4A:
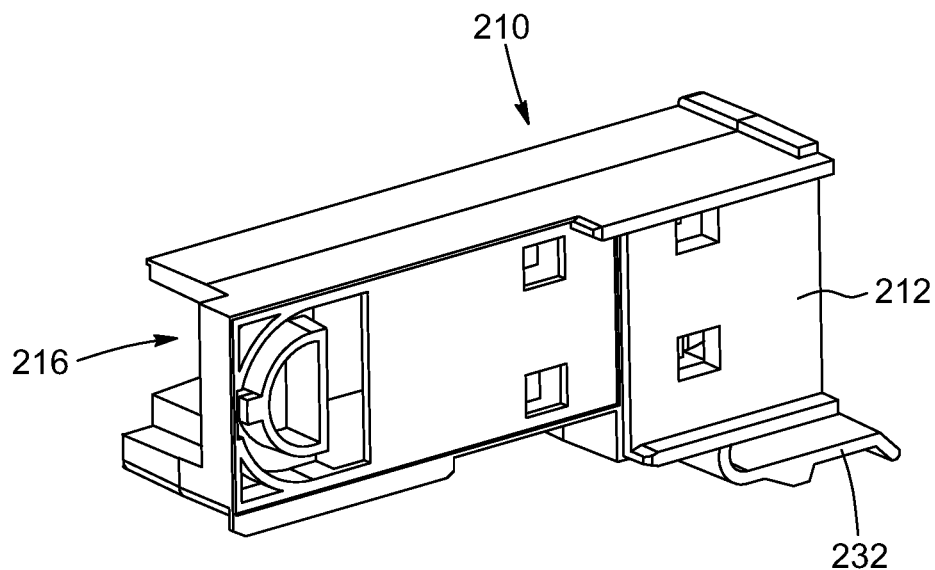
FIG. 4A is a side perspective view of a section of the connector cartridge casing, showing its outer side, according to a possible embodiment.
Figure 4B:
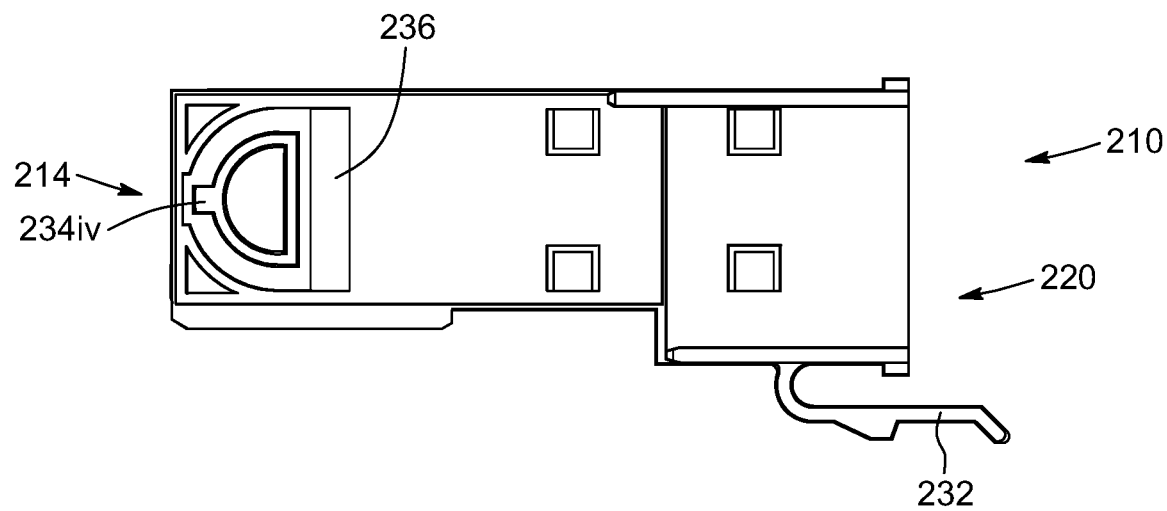
FIG. 4B is a side elevation view of the connector cartridge casing.
Figure 4C:
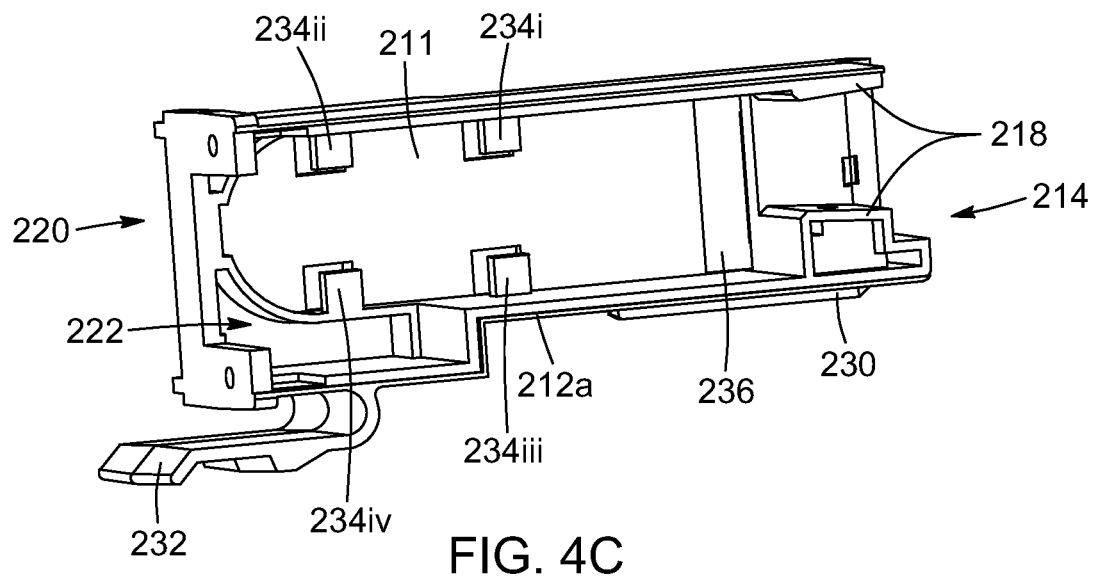
FIG. 4C is a side perspective view of the connector cartridge casing, showing its inner side, according to a possible embodiment.
Figure 4D:
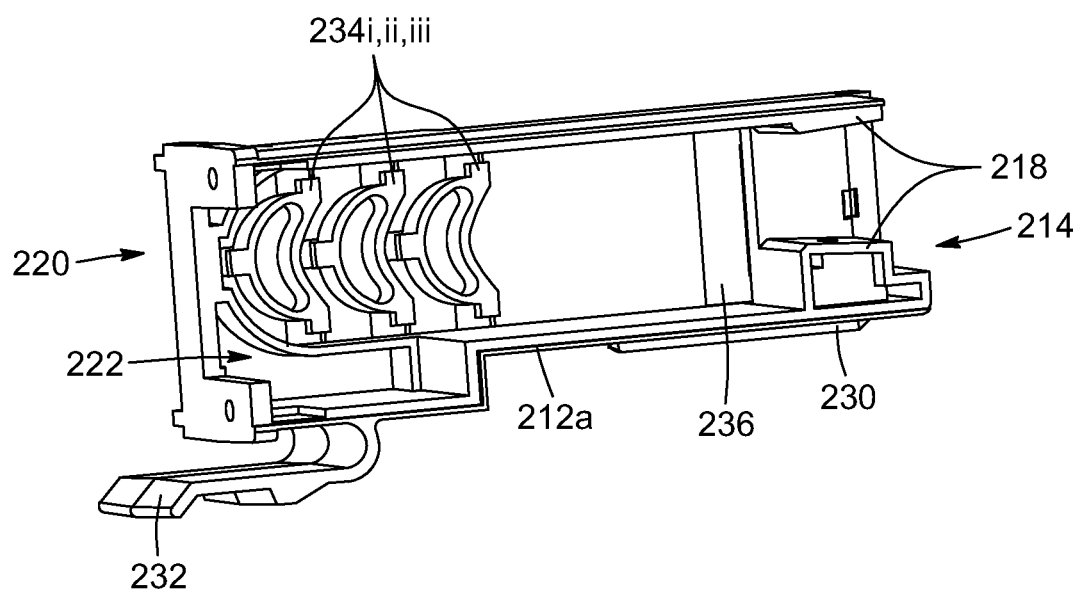
FIG. 4D is a side perspective view of a connector cartridge casing, according to another possible embodiment.

Referring now to FIGS. 4A to 4C, the cartridge casing (210) is shown from different points of view. FIG. 4D illustrates another possible embodiment of the casing (210). FIGS. 4C and 4D thus provides two different examples of winding guides, to facilitate placement of the optical cable in the cartridge. According to either embodiments of FIGS.

4C and 4D, the casing (210) is provided with winding guides (234i-234iv) for receiving bend portions of the fiber optic cable (256) housed therein. In the embodiment illustrated in FIG. 4D, the casing (210) is provided with three winding guides, which are formed by C-shaped protruding flanges, provided near the outer end (220) of the cartridge, to adapt to different lengths of fiber optic cables. In FIG. 4D, the winding guides (234i, 234ii 234 iii, 234iv) are provided as tabs spaced away from the lateral sidewall (211) of the connector cartridge casing (210). As such, the same casing design can be used for different fiber-size cartridges Although less practical, it would be possible to omit the winding guide(s), or to provide the casing with a single winding guide. Also, the winding guides can have other configurations, such as arch-shapes, S-shapes, circular shapes, tabs, etc. The fiber can thus be bent more than once within the casing, to maximize space usage inside the cartridge and provide a cartridge as small and compact as possible. As per the illustrated embodiment, a winding guide (234iv) near the inner end (214) of the cartridge can also be provided, on the outer or exterior side of the cartridge. In such configuration, it is best to form a fiber slot (236) in the lateral wall of the casing, for passing a portion of the fiber optic cable (256) therethrough, so that another bend portion of the fiber cable be supported by the winding guide (234iv) on the outer surface of the casing (210).

Referring to FIGS. 5 to 8, there is shown another variant of an optical test instrument (100) and associated connector cartridge (200).

In this embodiment, the optical test instrument (100) includes an instrument casing (110) having a cartridge receiving cavity (150). The instrument casing (110) and cartridge receiving cavity (150) may be the same or similar to those of embodiments described above. The optical test instrument (100) or this variant further includes a connector cartridge (200) sized and configured to fit in the cartridge receiving cavity (150) of the instrument casing (110) and having a U-shape defining a first branch (238) and a second branch (240). The first branch (238) is insertable into the cartridge receiving cavity (150) of the optical test instrument (100), and includes a cartridge inner end (214) which faces the test instrument optical port. The second branch (240) includes a cartridge outer end (220) for optical coupling to a device under test (DUT). The second branch (240) is configured to extend outside of the instrument casing (110), along one of its outer walls (114), when the first branch (238) of the connector cartridge (200) is inserted inside the cartridge receiving cavity (150). In the illustrated embodiment (see for example FIG. 5), the second branch (240) of the connector cartridge (200) extends along a back wall (114) of the instrument casing (110), on an opposite side of the display or other controls with which a user interfaces.

In some implementations, the connector cartridge (200) includes a first connector (252) at the cartridge inner end (214), for interfacing with the test instrument optical port of the optical test instrument; and a second connector (254) at the cartridge outer end (220). The first and second connectors (252, 254) can be angled physical contact (APC) connectors or ultra-physical contact (UPC) connectors, depending on the configuration needed for the end face (257) of the fiber. Other end face configurations are also possible. In addition, depending on the application, the first and second connectors (252, 254) can be standard connectors (SC), small form factor connectors, such as LC connectors, ferrule connectors, also referred to as "FC connectors"; and multi-fiber push on (MPO) connectors, as examples only.

Figures 7, 7A:
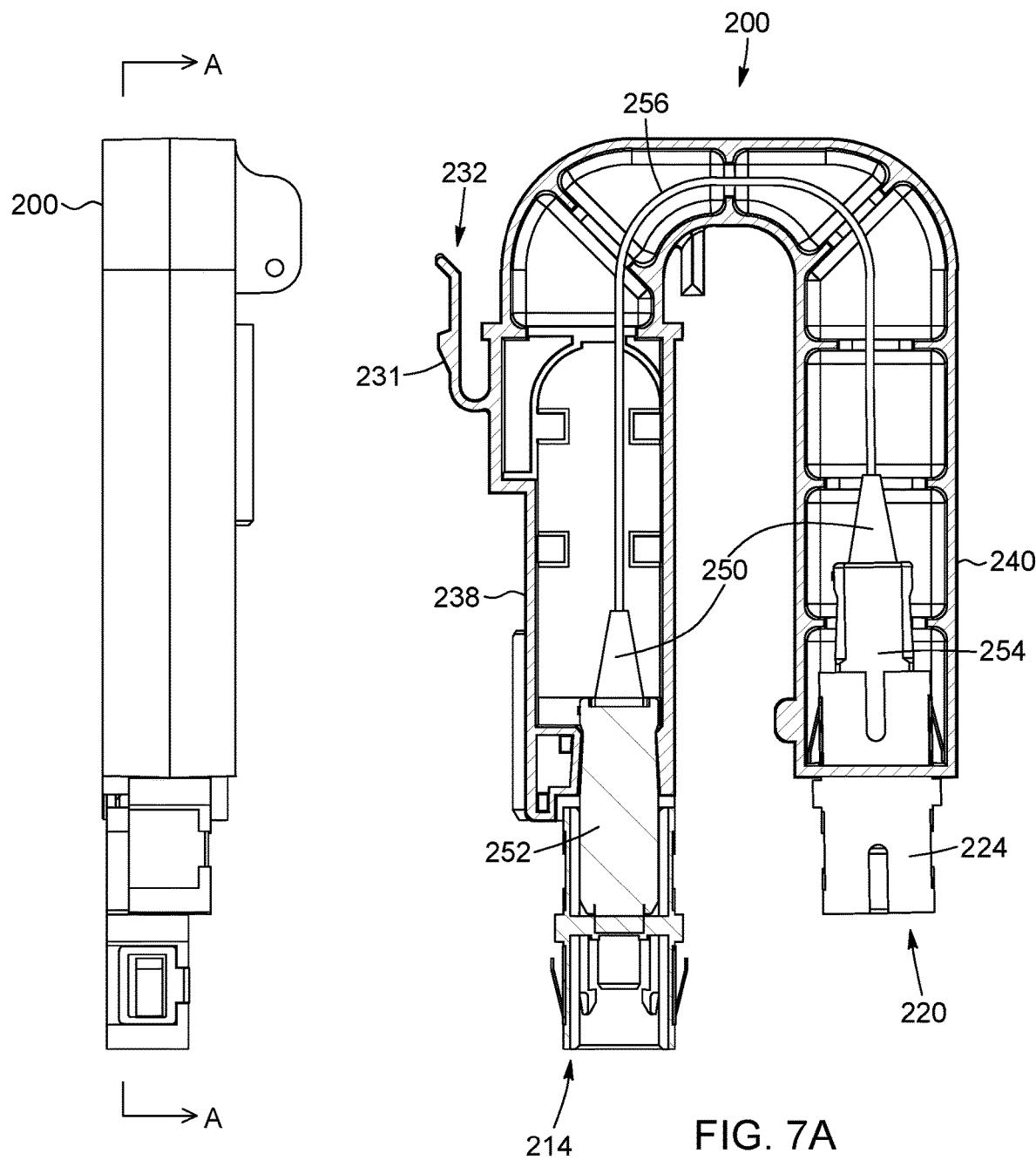
FIG. 7 is a side view of the connector cartridge of FIGS. 6A and 6B.
FIG. 7A is a cross-sectional view of the U-shaped connector cartridge along lines A-A of FIG. 7.

FIG. 7A show the inside of the connector cartridge (200) of the currently described embodiment. The connector cartridge (200) may include a fiber optic patch cord (250), for example of a commercially available type. Of course, different types of fiber optic cables can be used instead, with or without a protective layer or sheath. In the illustrative example of FIG. 7A, the fiber optic patch cord (250) includes the first connector (252) at one end, within the first branch (238), and the second connector (254) at the other end, in the second branch (240). The fiber optic cable (256) extends between the first and second connectors (252, 254). The fiber optic cable (256) can include a single optic fiber strand or multiple optic fiber strands. In this variant, because the connector cartridge (200) extends outside the optical test instrument (100), the connector cartridge (200) is long enough to accommodate the fiber optic cable (256) without creating small loops inside the cartridge, i.e., with a small bend radius. The radius of curvature of the fiber inside the connector cartridge (200) therefore allows to use regular optical fiber, i.e., non-bend insensitive, for the fiber optic cable (256). In some variants, the outer end (220) of the connector cartridge (200) may be provided with a DUT connector adapter (224), the second connector (254) of the fiber optic cable being received at one side of the DUT connector adapter (224)

In some implementations, the U-shaped connector cartridge (200) includes a cartridge casing (210), made from one or more molded plastic parts. As best seen on FIG. 6, the connector cartridge (200) may be provided with a clip (232), provided with a clip tab (231), which may be provided on the first branch (238) of the connector cartridge (200) proximate the bend of the "U" shape. When the optical connector cartridge (200) is inserted in the receiving cavity (150), the clip tab (231) engages with a corresponding recess in the casing (110) or another component of the test instrument, to connect and secure the cartridge (200) within the cavity (150). The clip (232) is slightly flexible or compressible, to allow disengagement of the clip tab (231) from the casing (110) for removal, when a user presses the clip. Other types of non-permanent connections can be considered, such as snap fit connections, male/female connectors, push buttons or even screws, just to name a few.

Figure 5:
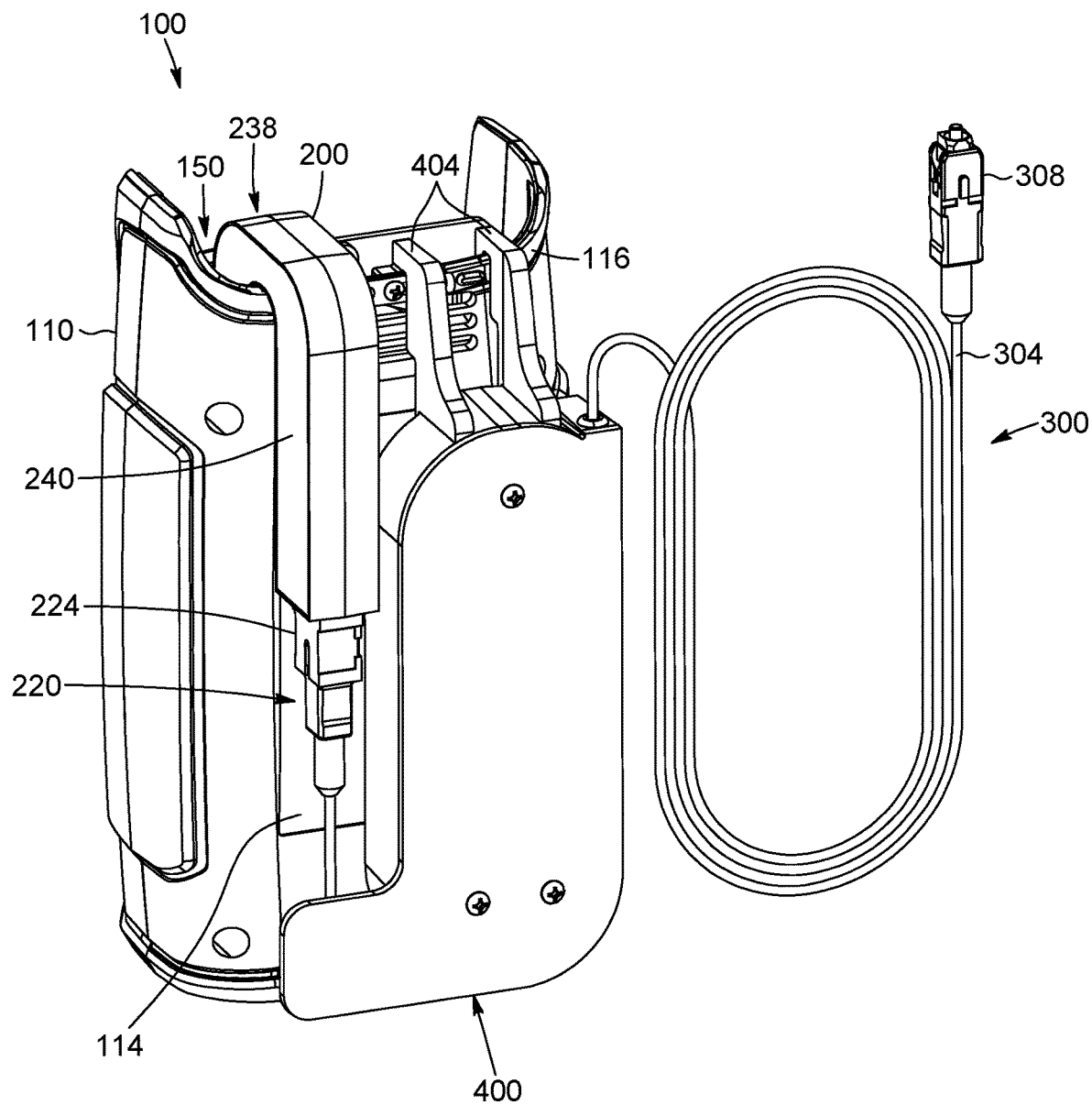
FIG. 5 is a perspective view from the back of an optical test instrument and associated connector cartridge, OTDR launch cord and launch cord cassette according to another possible embodiment.

A U-shaped connector cartridge (200) as described may be of particular interest for embodiments in which the optical test instrument (100) is an Optical Time Domain Reflectometer (OTDR). Referring to FIG. 5, in typical OTDR applications, a relatively long length of fiber optics is inherently required between the optical test instrument (100) and the DUT, to allow characterization of the input connector of the DUT. In the illustrated embodiment, the optical test instrument (100) therefore further includes an OTDR launch cord (300) providing the desired optical path. The OTDR launch cord (300) has an instrument end (302) connectable to the second connector of the connector cartridge (200), and a DUT end (304) connectable to the DUT. By way of example, the instrument end 302 of the OTDR launch cord (300) may be provided with (APC) connectors or ultra-physical contact (UPC) connectors, SC, LC, FC and MTP/MPO connectors, or the like, but preferably APC to minimize the Optical Return Loss (ORL). The DUT end of the OTDR launch cord may be provided with provided with (APC) connectors or ultra-physical contact (UPC) connectors, SC, LC, FC and MTP/MPO connectors, or the like, depending of the interfacing needs of a given application. In the illustrated example, both the instrument end and the DUT end of the OTDR launch cord are provided with a SC-APC connectors (306,308).

Figure 5A:
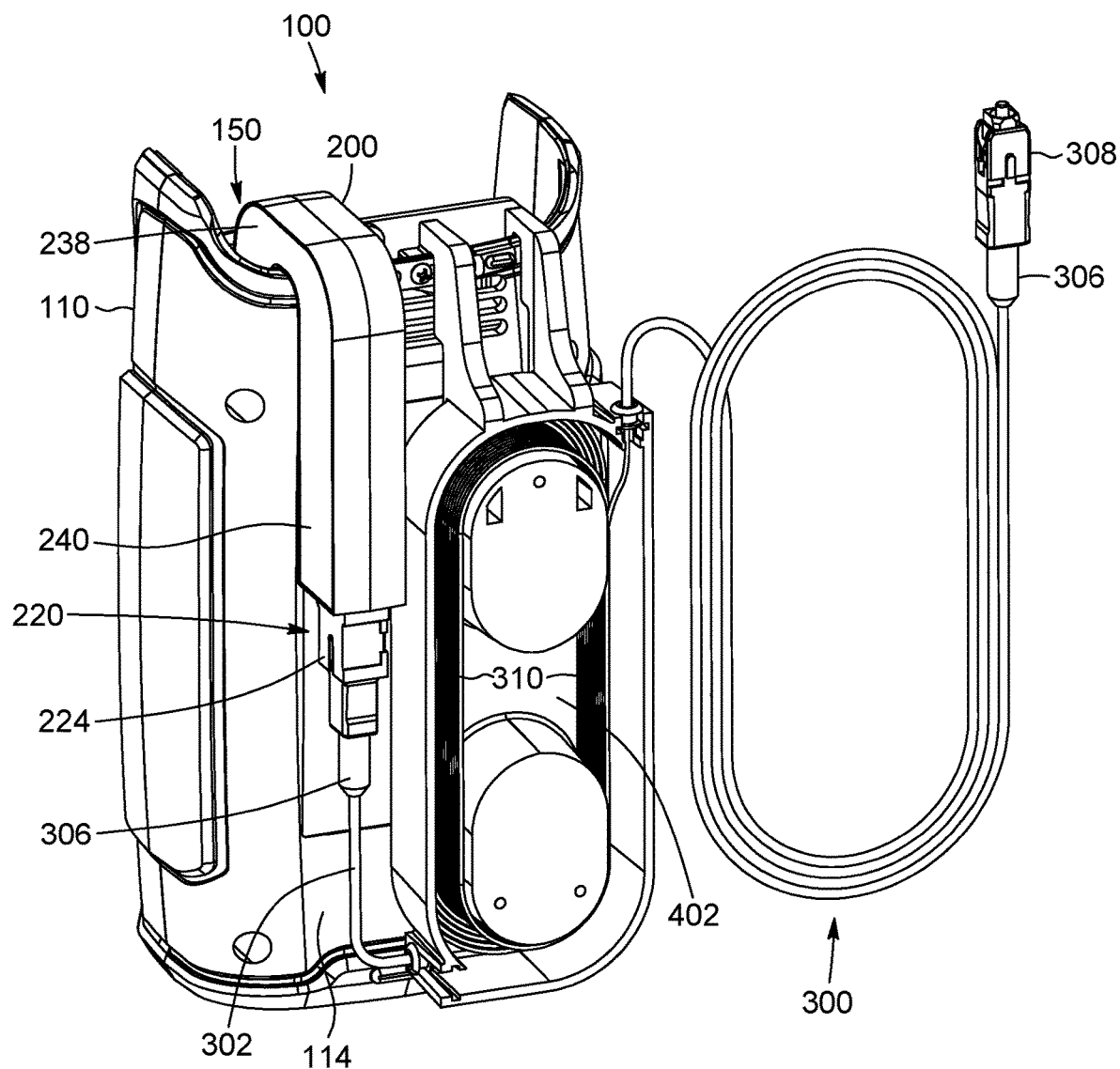
FIG. 5A is a similar representation as FIG. 5 showing the inside of the launch cord cassette.
Figure 6A:
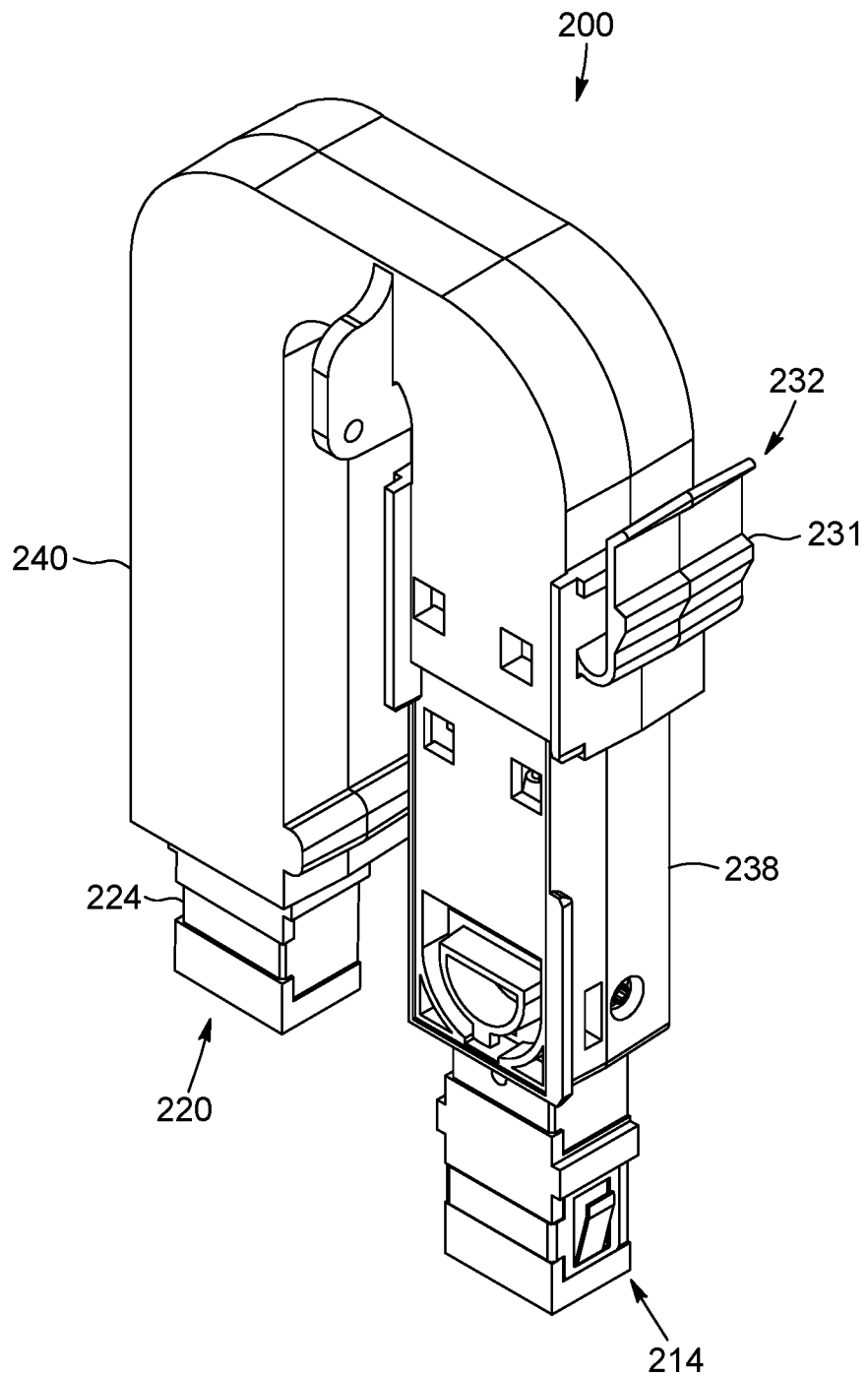
FIGS. 6A and 6B are perspective views of the U-shaped variant of a connector cartridge used in the optical instrument of FIG. 5, from opposite directions.
Figure 6B:
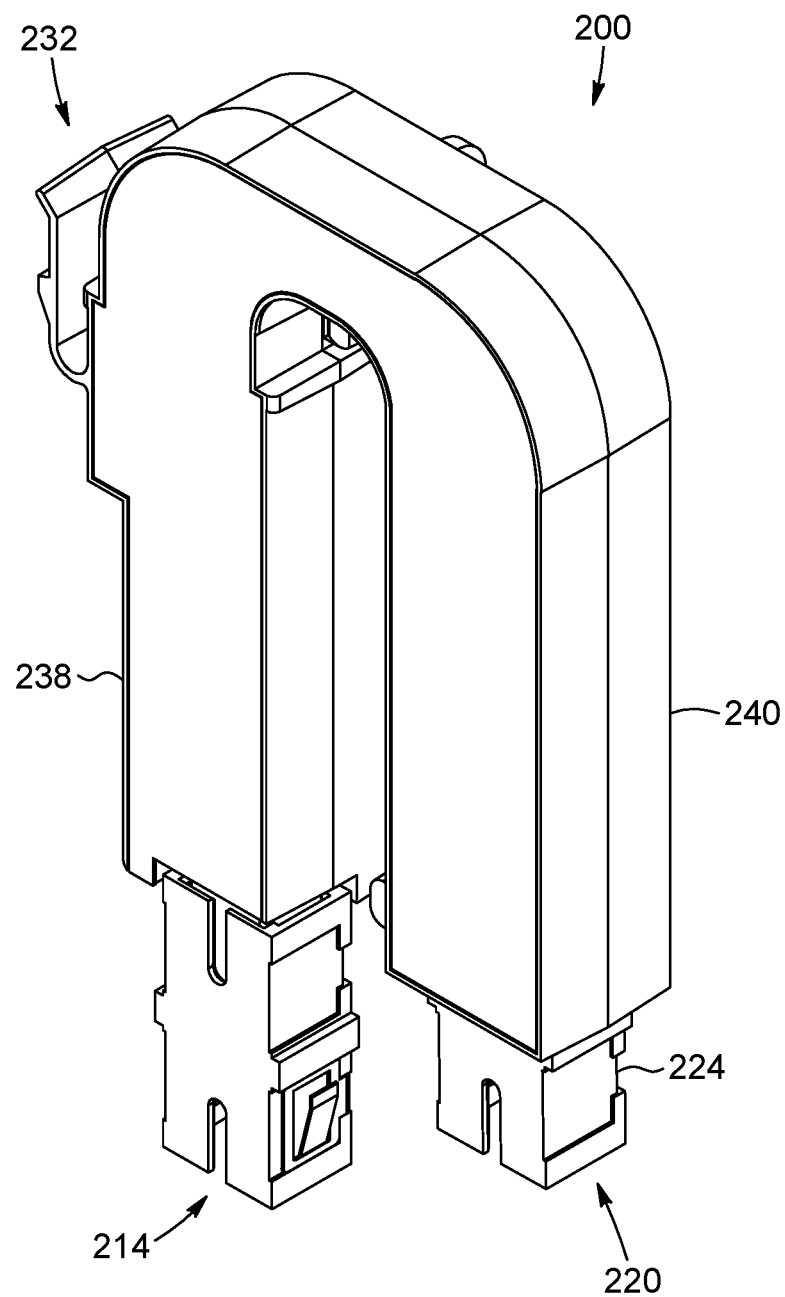
Figure 8:
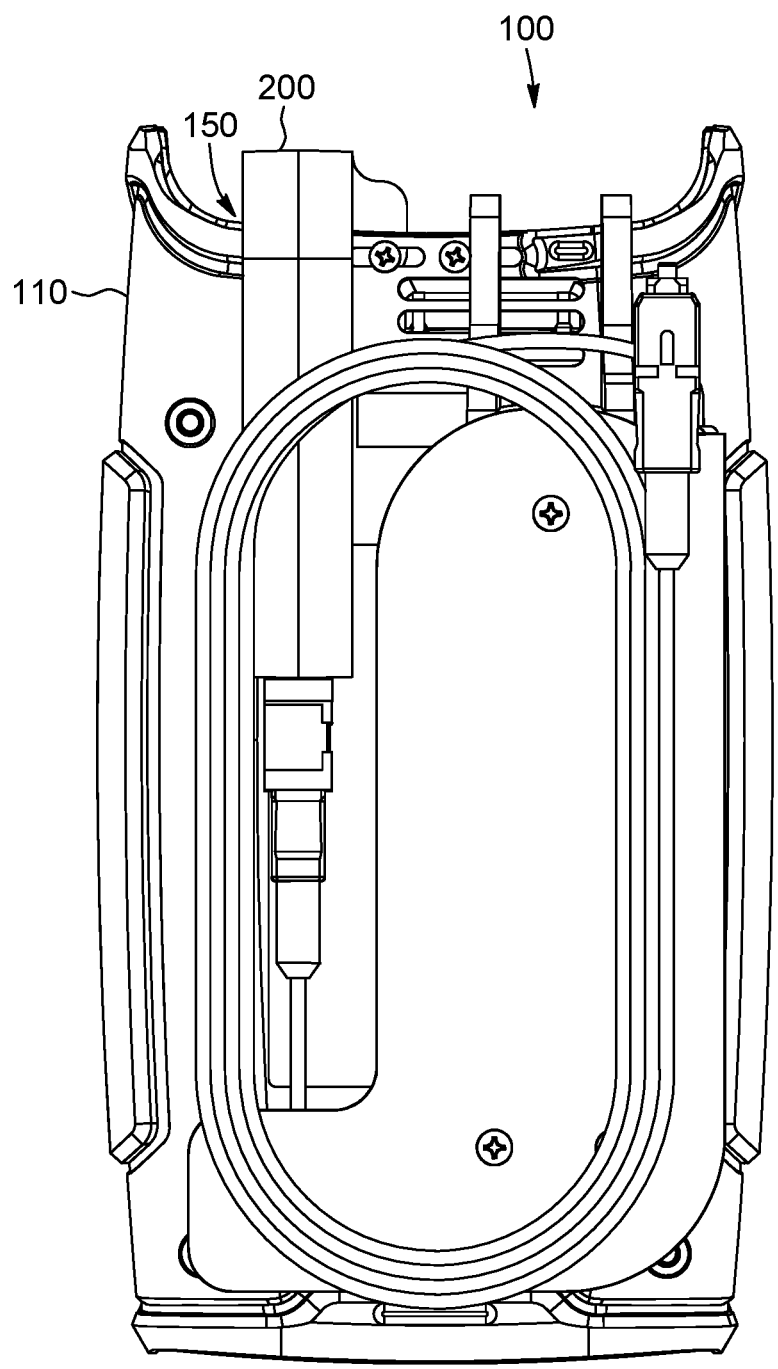
FIG. 8 is a back view of the combined optical test instrument, connector cartridge, OTDR launch cord and launch cord cassette of FIG. 5.

Referring more particularly to FIGS. 5, 5A and 8, the optical test instrument (100) further includes a launch cord cassette (400) configured for mounting to the instrument casing (110), proximate to the location of the second branch (240) of the connector cartridge (200) when the first branch (238) of the connector cartridge (200) is inserted inside the cartridge receiving cavity (150). In the illustrated embodiment, the launch cord cassette (400) is affixed along the outer (back) wall (114) of the instrument casing (110), side by side with the second branch (240) of the connector cartridge (200). The launch cord cassette (400) includes a cord housing (402) storing a section (310) of the OTDR launch cord (300) near the instrument end (302). In some variants, the launch cord cassette is removably mounted to the instrument casing (110), for example using a pair of parallel hooks (404) projecting from the cord housing (402) and engageable with a rim (116) formed on the instrument casing (110). Of course, numerous other attachment options may be considered. One or more cord spools (406) may be provided inside the cord housing 402, around which the stored section (310) of the OTDR launch cord (300) can be wound for compactness. The cord housing (402) of the launch cord cassette (400) may further include a pair of cord through holes (408, 410), the instrument end (302) and the DUT end (304) of the OTDR launch cord (300) projecting through these through holes (408, 410), respectively. The launch cord cassette (400) may also include a removable cover (412) providing access to the cord housing (402).

In use, the OTDR launch cord may remain connected to the connector cartridge at all times. As the second connector and/or connector adapter projecting from the second end of the connector cartridge are unobtrusively positioned and do not "stick out" of the instrument casing, it is unlikely to be accidentally damaged during handling of the optical test instrument by the user. In some implementations, the positioning of the launch cord cassette may also be selected to shield the second end of the connector cartridge from accidental contact and potential damage, and the launch cord cassette may also remain permanently attached to the instrument casing. Finally, in use, the optical test instrument and associated components may be inserted in a protective pocket or glove, which may additionally provide storage space for the free end of the OTDR launch cord.

The test instrument (100) described above can be sold with a connector cartridge (200) already provided therein, and replacement connector cartridges (200) can be sold separately. The fiber optic connector cartridge (200) can thus be commercialized in combination with an optical test instrument, or independently of the test instrument, allowing replacement thereof when optic fiber interfaces of the connector cartridge are damaged or worn. Advantageously, the connector cartridge described therein provides increased versatility to the test instrument, since the test instrument input can be changed so as to allow receiving different connector types, and thus the same test instrument can be used with different connector cartridges, depending on the device being tested. In other words, the instrument input connector can be changed to easily adapt to the connecter type of the DUT. It can also be considered to provide the optical test instrument with a set of different cartridges, each with different types of fibers and/or DUT connectors, so as to allow users to use the same optical test instrument for different types of optical devices being tested, by replacing the connector cartridge according to the DUT being tested.

As can be appreciated, with the above-described fiber optic connector cartridge for optical test instrument, it is possible to replace a damaged or worn DUT optic fiber interface of the optical test instrument. One simply needs removing the connector cartridge comprising the damaged or worn DUT optic fiber interfaces from the optical test instrument by sliding the cartridge out of a cartridge cavity provided in the optical test instrument; and inserting a replacement connector cartridge including an undamaged DUT optic fiber interface by sliding the replacement cartridge in the cartridge cavity of the optical test instrument. The described cartridge and optical test instrument allow end users to change faulty optical connectors without having to send their test instrument for repair, and the connector cartridge replacement can be made without any tool, and without having to open the test instrument.

Of course, numerous modifications could be made to the embodiments described above without departing from the scope of the present disclosure.

The invention claimed is:

1. An optical test instrument comprising:
   an instrument casing;
   a cartridge receiving cavity extending within the instrument casing, the cartridge receiving cavity having:
      an inner end provided with a test instrument optical port; and
      an outer end provided with a cartridge receiving opening, the opening being located on the instrument casing;
   a connector cartridge sized and configured to fit in the cartridge receiving cavity, the connector cartridge having:
      a cartridge inner end which faces the test instrument optical port, and
      a cartridge outer end for optical coupling to a device under test (DUT), the connector cartridge housing a fiber optic cable extending between the cartridge inner end and the cartridge outer end, the connector cartridge being removably connectable to the instrument casing.

2. The optical test instrument according to claim 1, wherein the connector cartridge comprises:
   a first connector at the cartridge inner end, for interfacing with the test instrument optical port of the optical test instrument; a second connector at the cartridge outer end; the fiber optic cable extending between the first and second connectors.

3. The optical instrument according to claim 2, wherein the outer end of the connector cartridge is provided with a DUT connector adapter, the second connector of the fiber optic cable being received at one side of the DUT connector adapter.

4. The optical test instrument according to claim 2, wherein the connector cartridge has a U-shape defining a first branch insertable into the cartridge receiving cavity and comprising the cartridge inner end; and a second branch comprising the cartridge outer end and configured to extend outside of the instrument casing along an outer wall of the instrument casing when the first branch of the connector cartridge is inserted inside the cartridge receiving cavity.

5. The optical test instrument according to claim 4, wherein the optical test instrument is an Optical Time Domain Reflectometer (OTDR), and the optical test instrument further comprises an OTDR launch cord having an instrument end connectable to the second connector and a DUT end connectable to the DUT.

6. The optical test instrument according to claim 5, further comprising a launch cord cassette configured for mounting to the instrument casing proximate to a location of the second branch of the connector cartridge when the first branch of the connector cartridge is inserted inside the cartridge receiving cavity, the launch cord cassette comprising a cord housing storing a section of the OTDR launch cord near the instrument end.

7. The optical test instrument according to claim 6, wherein the launch cord cassette comprises one or more cord spools provided inside the cord housing.

8. The optical test instrument according to claim 6, wherein the cord housing comprises a pair of cord through holes, the instrument end and the DUT end of the OTDR launch cord projecting through said through holes, respectively.

9. The optical test instrument according to claim 6, wherein the launch cord cassette comprises a removable cover providing access to said cord housing.

10. The optical test instrument according to claim 2, wherein the first and second connectors are angled physical contact (APC) connectors or ultra-physical contact (UPC) connectors.

11. The optical test instrument according to claim 2, wherein the first and second connectors are one of SC, LC, FC and MTP/MPO connectors, the fiber optic cable being a single fiber or multi-fiber fiber cable.

12. The optical test instrument according to claim 5, wherein the instrument end and/or the DUT end of the OTDR launch cord is provided with an angled physical contact (APC) connector or ultra-physical contact (UPC) connector.

13. The optical test instrument according to claim 5, wherein the instrument end and/or the DUT end of the OTDR launch cord is provided with one of SC, LC, FC and MTP/MPO connectors, the fiber optic cable being a single fiber or multi-fiber fiber cable.

14. The optical test instrument according to claim 4, wherein the connector cartridge is provided with a resilient clip on the first branch, allowing toolless insertion and removal of the cartridge from within the instrument casing.

15. A fiber optic connector cartridge, for use in combination with an optical test instrument comprising an instrument casing, a cartridge receiving cavity extending within the instrument casing and an optical port inside the cartridge receiving cavity, the test instrument receiving a fiber optical cable of a device under test (DUT), the connector cartridge comprising:
a cartridge casing, sized and configured to fit in the cartridge receiving cavity extending within the optical test instrument, the cartridge casing having an inner end and an outer end, the outer end being provided with a DUT connector adapter, for optically coupling to the DUT;
a fiber optic cable housed within the cartridge casing, the fiber optic cable comprising a first connector and a second connector, and a fiber optic link extending therebetween, the first connector being configured for interfacing with the optical port inside the test instrument;
the second connector of the fiber optic cable being received at one side of the DUT connector adapter;
the connector cartridge being removably connectable to the optical test instrument.

16. The fiber optic connector cartridge according to claim 15, the connector cartridge has a U-shape defining a first branch insertable into the cartridge receiving cavity and comprising the cartridge inner end; and a second branch comprising the cartridge outer end and configured to extend outside of the instrument casing along an outer wall of the instrument casing when the first branch of the connector cartridge is inserted inside the cartridge receiving cavity.

17. The fiber optic connector cartridge according to claim 16, wherein the optical test instrument is an Optical Time Domain Reflectometer (OTDR), in combination with an OTDR launch cord having an instrument end connectable to the second connector and a DUT end connectable to the DUT.

18. The fiber optic connector cartridge and OTDR launch cord combination according to claim 17, in further combination with a launch cord cassette configured for mounting to the instrument casing proximate to a location of the second branch of the connector cartridge when the first branch of the connector cartridge is inserted inside the cartridge receiving cavity, the launch cord cassette comprising a cord housing storing a section of the OTDR launch cord near the instrument end.

* * * * *